United States Patent
Lévesque

(10) Patent No.: US 12,473,883 B2
(45) Date of Patent: Nov. 18, 2025

(54) ENERGY-RECOVERY TURBINE WITH PRESSURE-RELEASE VALVE

(71) Applicant: Corporation Bearstream Inc., Boucherville (CA)

(72) Inventor: Normand Lévesque, Quebec (CA)

(73) Assignee: CORPORATION BEARSTREAM INC., Boucherville (CA)

( * ) Notice: Subject to any disclaimer, the term of this patent is extended or adjusted under 35 U.S.C. 154(b) by 0 days.

(21) Appl. No.: 18/520,831

(22) Filed: Nov. 28, 2023

(65) Prior Publication Data

US 2024/0175419 A1    May 30, 2024

Related U.S. Application Data

(60) Provisional application No. 63/385,086, filed on Nov. 28, 2022.

(51) Int. Cl.
| | | |
|---|---|---|
| *F03B 11/00* | (2006.01) | |
| *F03B 3/02* | (2006.01) | |
| *F03B 3/04* | (2006.01) | |
| *F03B 3/12* | (2006.01) | |
| *F03B 13/10* | (2006.01) | |
| *F03B 13/14* | (2006.01) | |
| *F03B 13/22* | (2006.01) | |
| *F03B 13/26* | (2006.01) | |
| *F03B 15/02* | (2006.01) | |
| *F03B 15/04* | (2006.01) | |

(Continued)

(52) U.S. Cl.
CPC .............. *F03B 11/004* (2013.01); *F03B 3/02* (2013.01); *F03B 15/04* (2013.01); *F03B 3/04* (2013.01); *F03B 3/125* (2013.01); *F03B 13/10* (2013.01); *F03B 13/144* (2013.01); *F03B 13/148* (2013.01); *F03B 13/22* (2013.01); *F03B 13/264* (2013.01); *F03B 15/02* (2013.01); *F03B 15/06* (2013.01); *F03B 17/06* (2013.01); *F05B 2210/302* (2013.01); *F05B 2220/32* (2013.01); *F05B 2240/965* (2020.08)

(58) Field of Classification Search
CPC combination set(s) only.
See application file for complete search history.

(56) References Cited

U.S. PATENT DOCUMENTS

| | | | | |
|---|---|---|---|---|
| 4,731,545 | A * | 3/1988 | Lerner | F03B 13/04 |
| | | | | 416/185 |
| 12,123,388 | B1* | 10/2024 | Eldredge | F03B 17/06 |
| 2016/0305396 | A1* | 10/2016 | Oncale | F03B 15/06 |

(Continued)

*Primary Examiner* — Binh Q Tran
(74) *Attorney, Agent, or Firm* — William J. Barber; WARE FRESSOLA MAGUIRE & BARBER LLP

(57) ABSTRACT

An energy-recovery system has an energy-recovery turbine to receive a flow of water from a water line to which the turbine is connected and to generate electric power from the flow of water while also regulating water pressure in the water line. The system also includes a pressure-regulating valve (PRV) connected in parallel with the turbine to regulate the water pressure in the water line only when the turbine is inoperative. The system includes a spiral water-flow adapter having a water inlet for connecting to an upstream portion of the water line and a water outlet for connecting to a downstream portion of the water line, the spiral water-flow adapter directing the flow of water from the water inlet into the turbine and then to the water outlet.

18 Claims, 10 Drawing Sheets

(51) Int. Cl.
*F03B 15/06* (2006.01)
*F03B 17/06* (2006.01)

(56) References Cited

U.S. PATENT DOCUMENTS

| | | | |
|---|---|---|---|
| 2020/0080538 A1* | 3/2020 | Hector, Jr. | F03B 13/266 |
| 2022/0128044 A1* | 4/2022 | Semler | F03B 13/00 |
| 2022/0368195 A1* | 11/2022 | Millius | F03B 13/00 |
| 2023/0323851 A1* | 10/2023 | Holland | E21B 41/0085 |
| | | | 166/244.1 |

* cited by examiner

Section D-D

Vue G

ENERGY-RECOVERY TURBINE WITH PRESSURE-RELEASE VALVE

CROSS REFERENCE TO RELATED APPLICATIONS

This application claims priority from U.S. Provisional Patent Application No. 63/385,086, filed 28 Nov. 2022, which is hereby incorporated by reference.

TECHNICAL FIELD

The present invention relates generally to energy-recovery devices and, in particular, to hydroelectric turbines for recovering energy from water.

BACKGROUND

In various industrial applications having pressurized water lines, it is known to employ pressure-regulating valves to regulate the pressure in the water lines. For example, in underground mines, it is known to place a pressure-regulating valve (PRV) at various depths to regulate the pressure in a water line that extends down into the mine. PRVs are also used in analogous manners in other industries like the oil and gas industry. One of the shortcomings of a PRV is its limited life span. The PRV must be periodically serviced or replaced, resulting in expensive recurring costs and downtime affecting revenues of the mine or other industrial facility.

A technical solution to this problem would be highly desirable.

SUMMARY

In general, the present invention provides an energy-recovery system having an energy-recovery turbine that both generates electric power from water flowing in a water line and regulates water pressure in the water line. The energy-recovery system also includes a pressure-regulating valve (PRV) that regulates pressure in the water line when the turbine is inoperative. The PRV releases pressure in the water line as a failsafe mechanism in case the turbine has to shut down or becomes inoperative.

One inventive aspect of the disclosure is an energy-recovery system having an energy-recovery turbine to receive a flow of water from a water line to which the turbine is connected. The turbine both generates electric power from the flow of water and regulates water pressure in the water line. The system also includes a pressure-regulating valve (PRV) installed in parallel with the turbine to regulate pressure in the water line in the event that the turbine shuts down or becomes inoperative. The system includes a spiral water-flow adapter having a water inlet for connecting to an upstream portion of the water line and a water outlet for connecting to a downstream portion of the water line, the spiral water-flow adapter directing the flow of water from the water inlet into the turbine (guide vanes circle and runner). By closing the variably adjustable guide vanes of the turbine, the flow can be diverted through the PRV. The PRV thus releases pressure only in case of turbine failure or other electric failure on the grid, referred to herein as a turbine bypass condition. Water can thus be diverted into the PRV to bypass the turbine. This provides three forms of protection: (1) avoiding water hammer when an emergency stop of the turbine occurs; (2) ensuring initial start-up water regulation pressure during a transitory period when the water pipe system is put into operation or shut down; and (3) providing a general backup for any possible problem encountered with the turbine or grid.

Another inventive aspect of the disclosure is a method of recovering energy from a flow of water. The method entails receiving the flow of water at an energy-recovery turbine from a water line to which the turbine is connected, thereby generating electric power from the flow of water while also regulating water pressure in the water line. If a turbine bypass condition occurs, the method entails diverting the flow water to a pressure-regulating valve (PRV) connected in parallel with the turbine in order to regulate the pressure in the water line.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are described below in relation to the accompanying drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
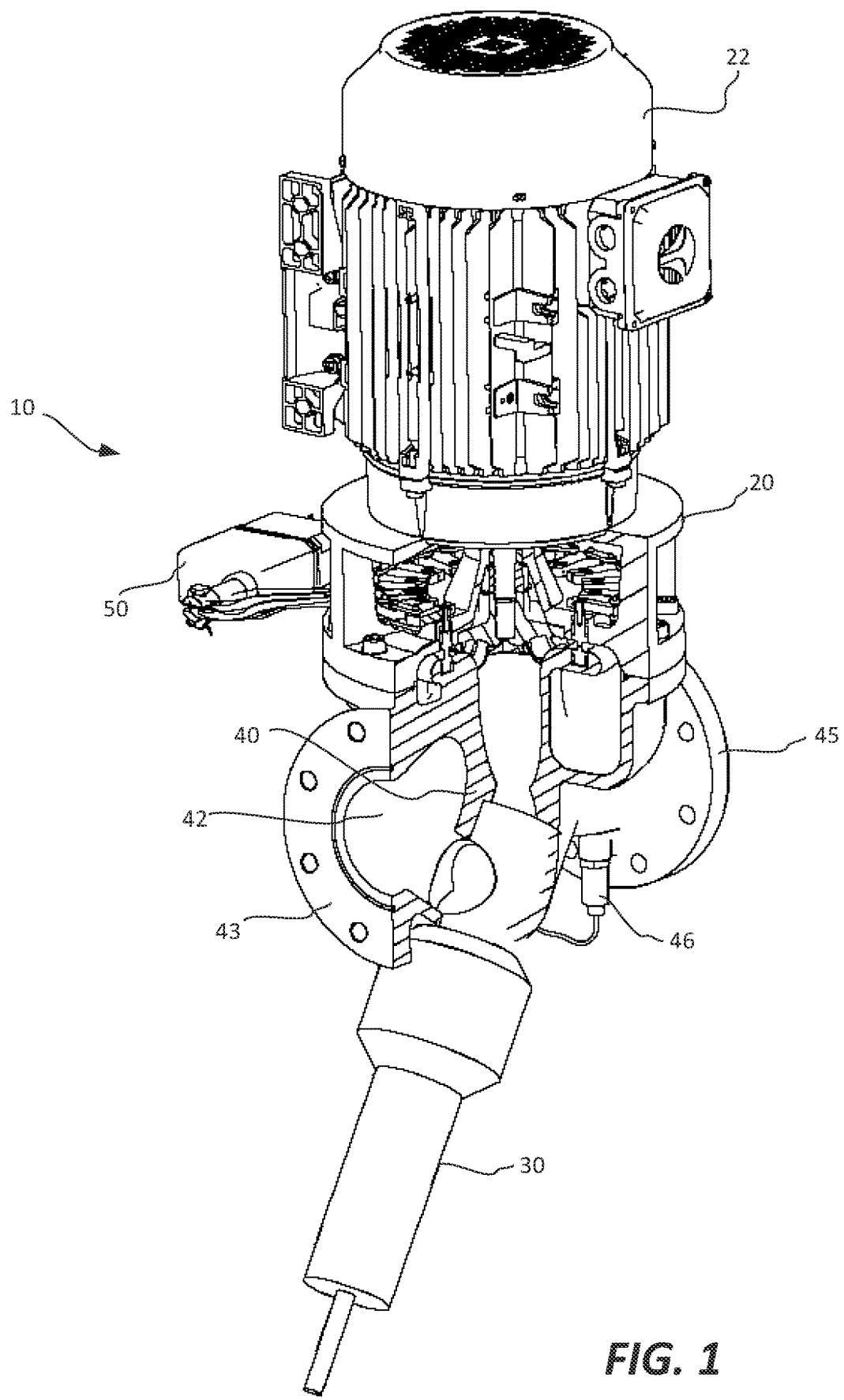
FIG. 1 is an isometric view of an energy-recovery system having a turbine and a PRV in accordance with an embodiment of the present invention.

In the embodiment depicted by way of example in FIGS. 1-8, an energy-recovery system denoted generally by reference numeral 10 includes an energy-recovery turbine 20 to receive a flow of water from a water line to which the turbine is connected. The turbine both generates electric power from the flow of water and also regulates water pressure in the water line. The turbine reduces the water pressure in the water line by extracting energy from the flowing water. In the embodiment depicted by way of example in FIGS. 1-8, the system 10 also includes a pressure-regulating valve (PRV) denoted by reference numeral 30 that is connected to the turbine and the water line to regulate pressure in the water line when operating in a turbine-bypass mode, i.e. when the turbine is shut down or inoperative.

In one embodiment, as depicted by way of example in FIGS. 1-8, the system includes a spiral water-flow adapter 40 having a water inlet 42 for connecting to an upstream portion of the water line and a water outlet 44 for connecting to a downstream portion of the water line. The spiral water-flow adapter has an internal flow passage that is shaped to direct the flow of water from the water inlet into the turbine (guide vane circle and runner) and from the turbine to the water outlet.

Figure 2:
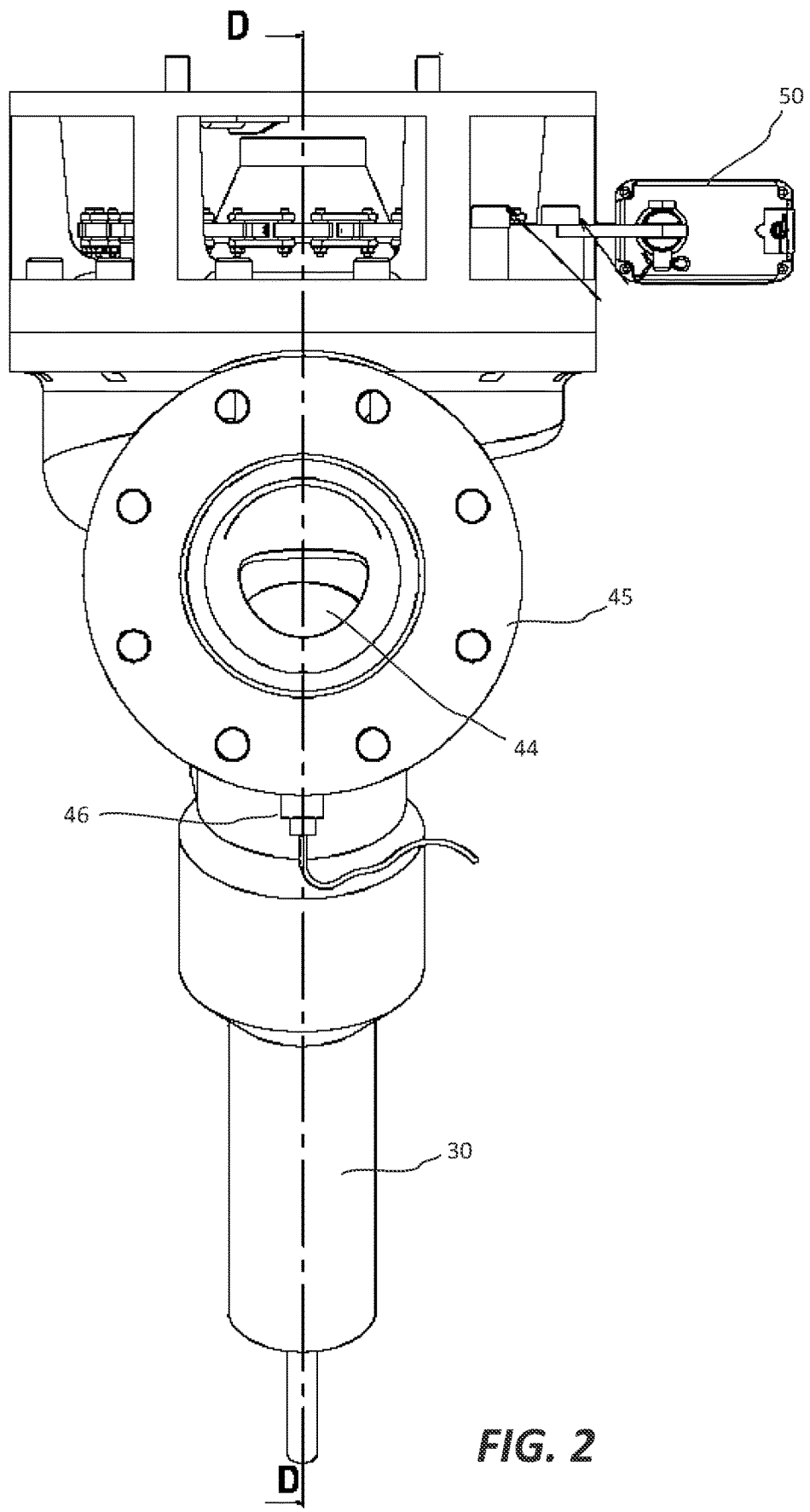
FIG. 2 is a front view of a portion of the system of FIG. 1, showing the PRV and the turbine without the generator.

In one embodiment, as depicted by way of example in FIGS. 1 and 2, the system includes a pressure sensor 46 installed in the spiral water-flow adapter to sense a pressure of the flow of water to control an actuator to fully close the guides vanes of the turbine to divert the water into the PRV. When the water pressure exceeds a threshold related to the spring constant of the spring inside the PRV, the water pressure is released by the PRV. In other words, the PRV may be a passive, purely mechanical device that has a valve held normally closed by a spring that opens automatically when the downstream water pressure exceeds a particular threshold corresponding to the spring constant of the spring.

Figure 3:
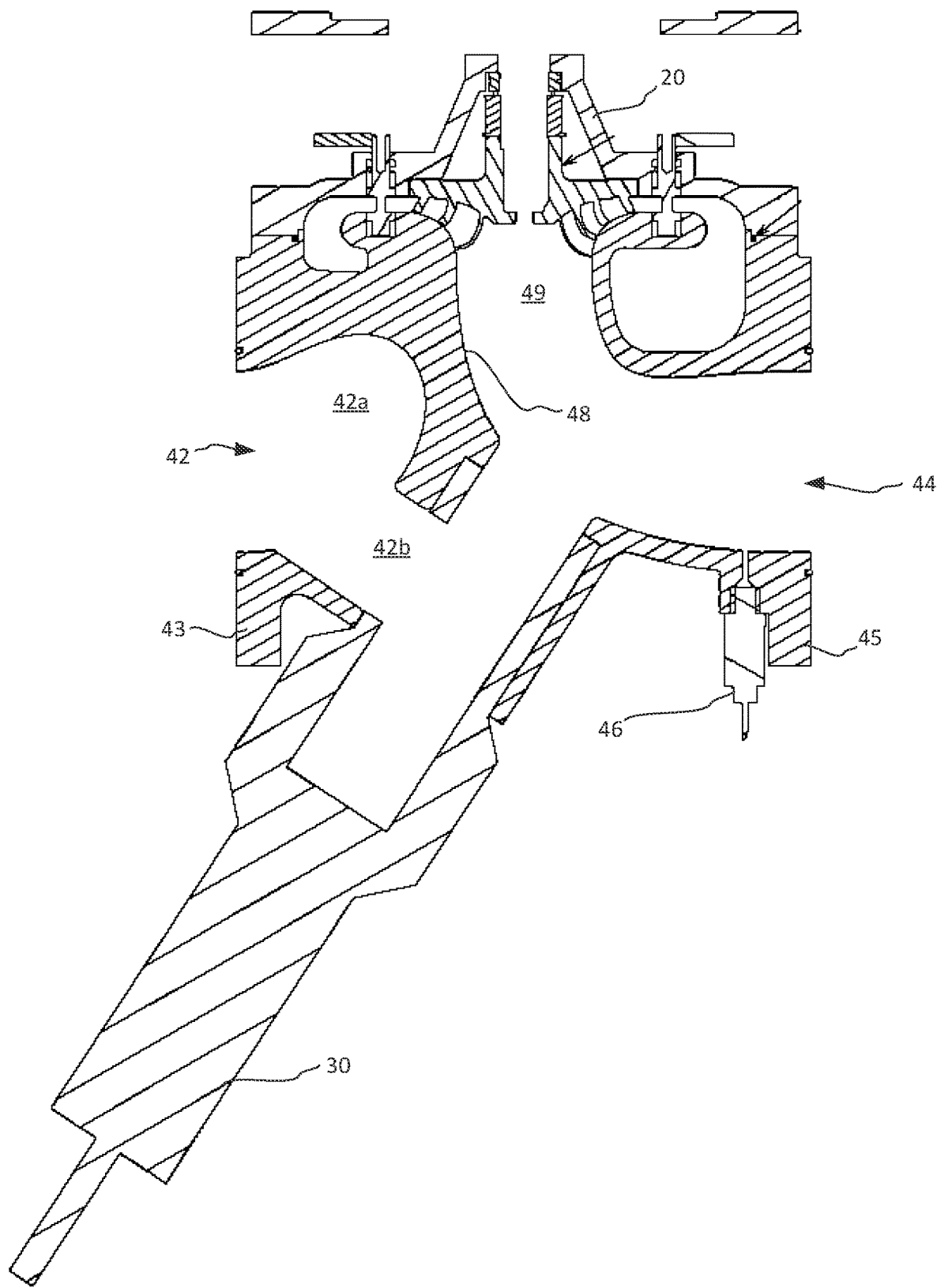
FIG. 3 is a cross-sectional view taken through section D-D of FIG. 2.

In one embodiment, as depicted by way of example in FIG. 3, the spiral water-flow adapter 40 includes a 90-degree elbow 48 for directing the flow of water from the turbine to the water outlet 44. The PRV 30 in this example is connected to the elbow 48 and extends at an oblique angle downwardly from the elbow. In one specific implementation, the PRV connects to the elbow approximately midway along the elbow such that the PRV extends obliquely at approximately 40-50 degrees. The angle of the PRV may be varied in other implementations. Likewise, it is not necessary for the PRV to connect to the elbow at the approximate midpoint along the elbow. In the specific implementation of FIG. 3, the diameter of the upper vertical portion 49 of the elbow 48 is smaller than the diameter of the water outlet 44. In other implementations, the diameter of the upper vertical portion may be the same as, or greater than, the diameter of the water outlet. In the specific implementation depicted by way of example in FIG. 3, the water inlet 42 has a lobe-shaped cavity 42a and a straight conduit section 42b that is orthogonal to the conduit of the PRV 30.

In one embodiment, the spiral water-flow adapter 40 is formed as a single integral piece which may be molded, cast or 3D printed. Alternatively, the spiral water-flow adapter may be assembled from multiple components.

In one embodiment, the spiral water-flow adapter 40 comprises a first flange 43 at the water inlet 42 for connecting to the upstream portion of the water line and a second flange 45 at the water outlet 44 for connecting to the downstream portion of the water line.

The turbine 20 includes a runner, built of a plurality of turbine blades attached to a hub or wheel that rotates when water flows through the turbine. A generator 22 is attached to the turbine runner and shaft to rotate in unison to thereby generate electric power. In the illustrated embodiment, the turbine is a Francis turbine. Although a Francis type turbine is considered to be the most advantageous implementation, it will be appreciated that other types of small hydroelectric turbines may be used with suitable modifications.

In the illustrated embodiment, an axis of rotation of the turbine 20 and the generator 22 is orthogonal to a notional line extending from the water inlet to the water outlet.

Figure 4:
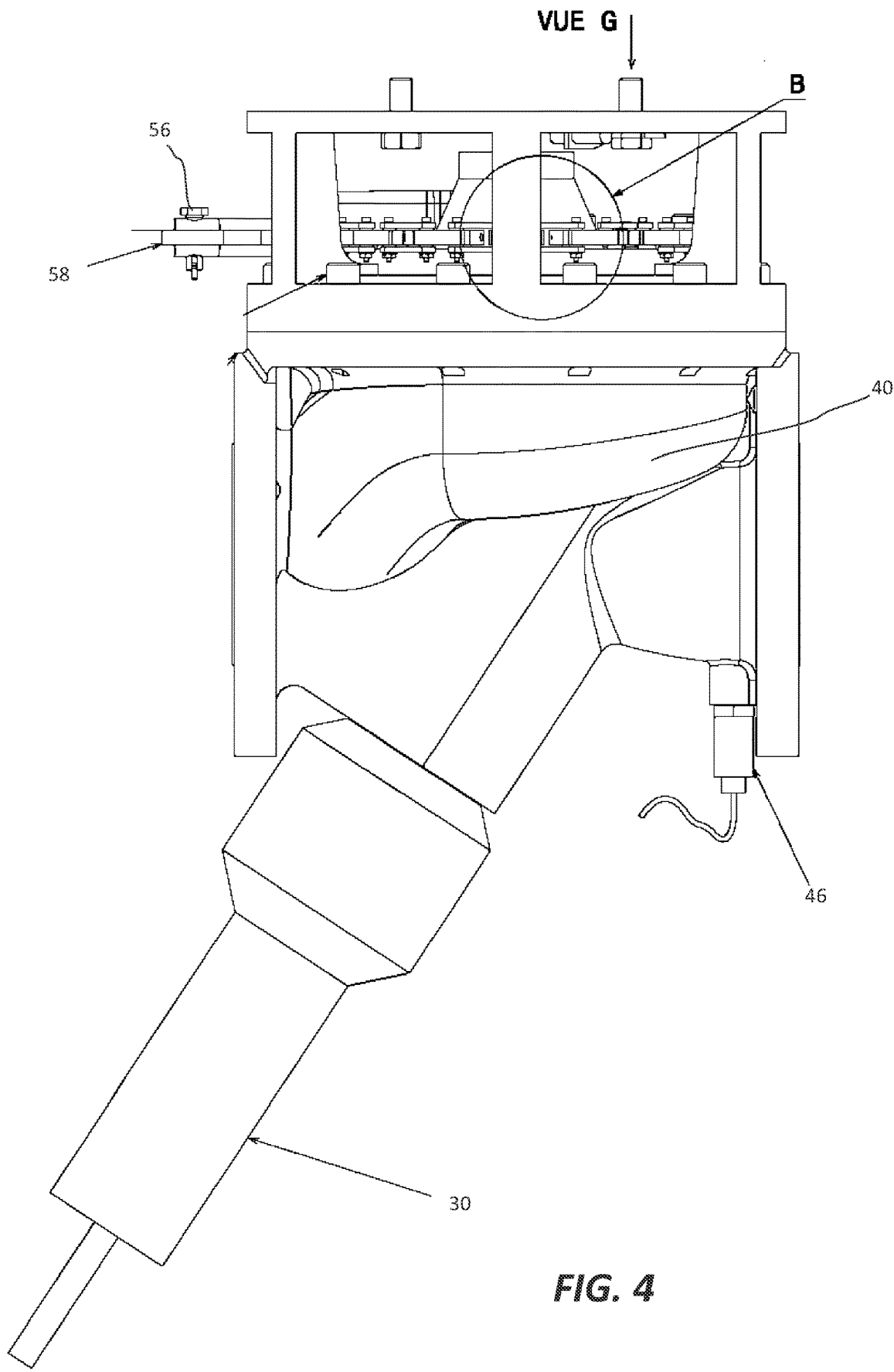
FIG. 4 is a side view of the portion of the system shown in FIG. 2.
Figure 5:
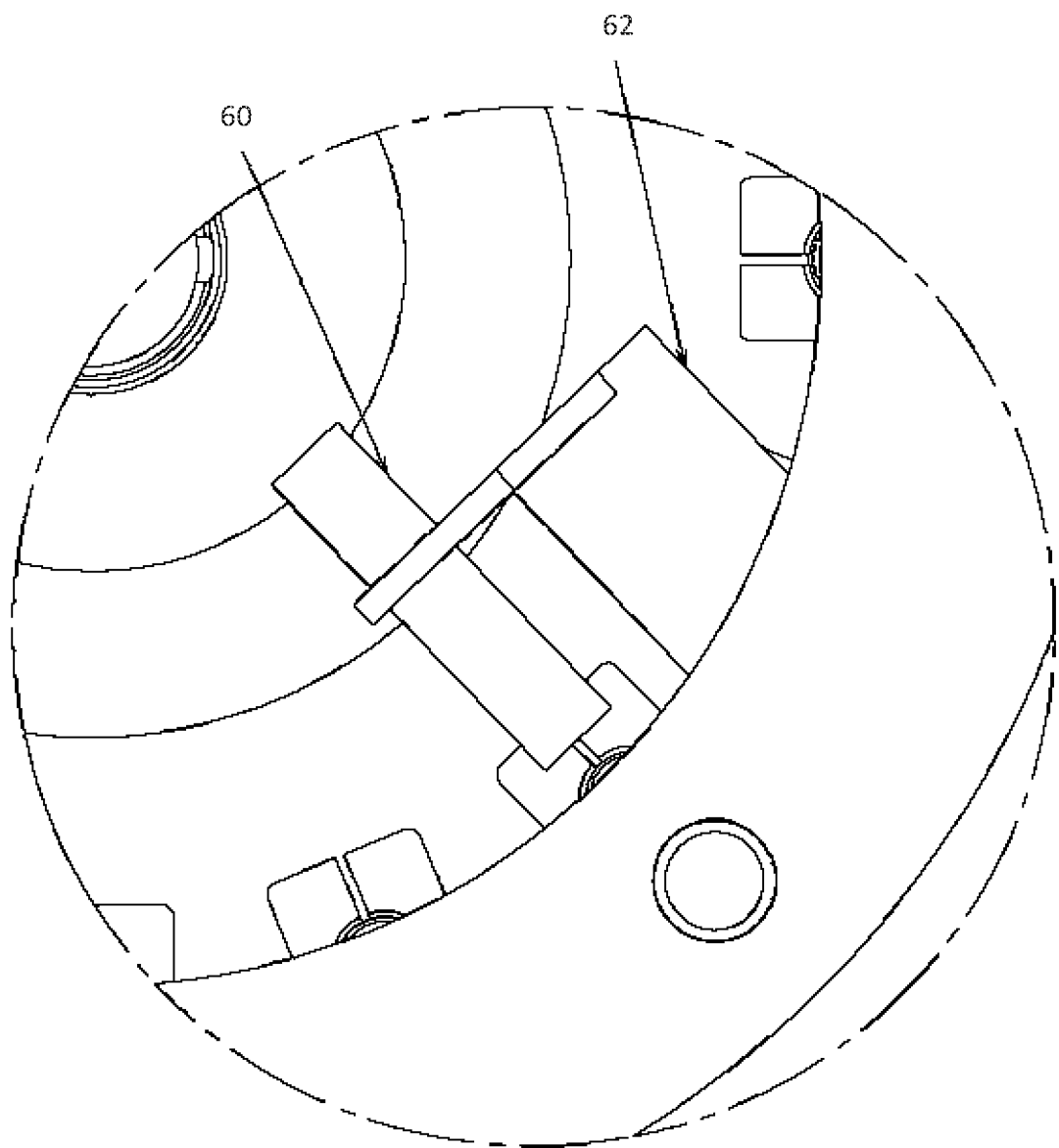
FIG. 5 is a detail view of an upper part of the turbine denoted as View G in FIG. 4
Figure 6:
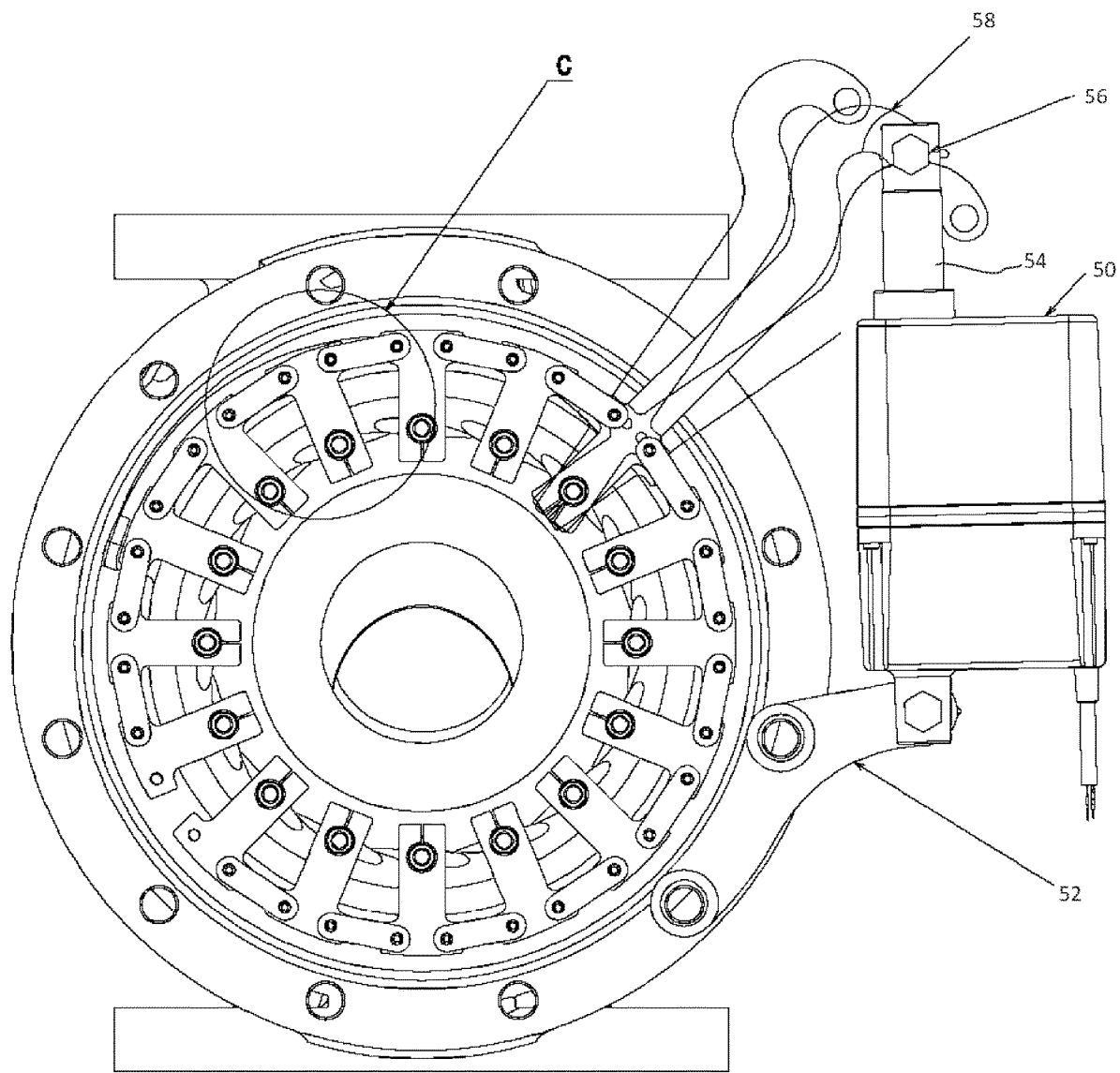
FIG. 6 is a top view of the turbine without the generator.

In the illustrated embodiment, as shown particularly in FIGS. 4-6, the turbine guide vanes circle includes an actuator 50 supported by an actuator support member 52. The actuator includes an actuation rod 54 that is fastened to a lever arm 58 by a shear pin 56 (or other equivalent fastener). The actuator 50 is thus able to actuate the lever arm 58 to control the guide vanes of the turbine. The actuator 50 can fully close the guide vanes of the turbine in order to divert water into the PRV. The turbine may include a speed sensor 60 mounted to a sensor support member 62 as shown for example in FIG. 5. The actuator 50 may control the vanes in response to a signal from the speed sensor 60 to optimize turbine efficiency.

Figure 7:
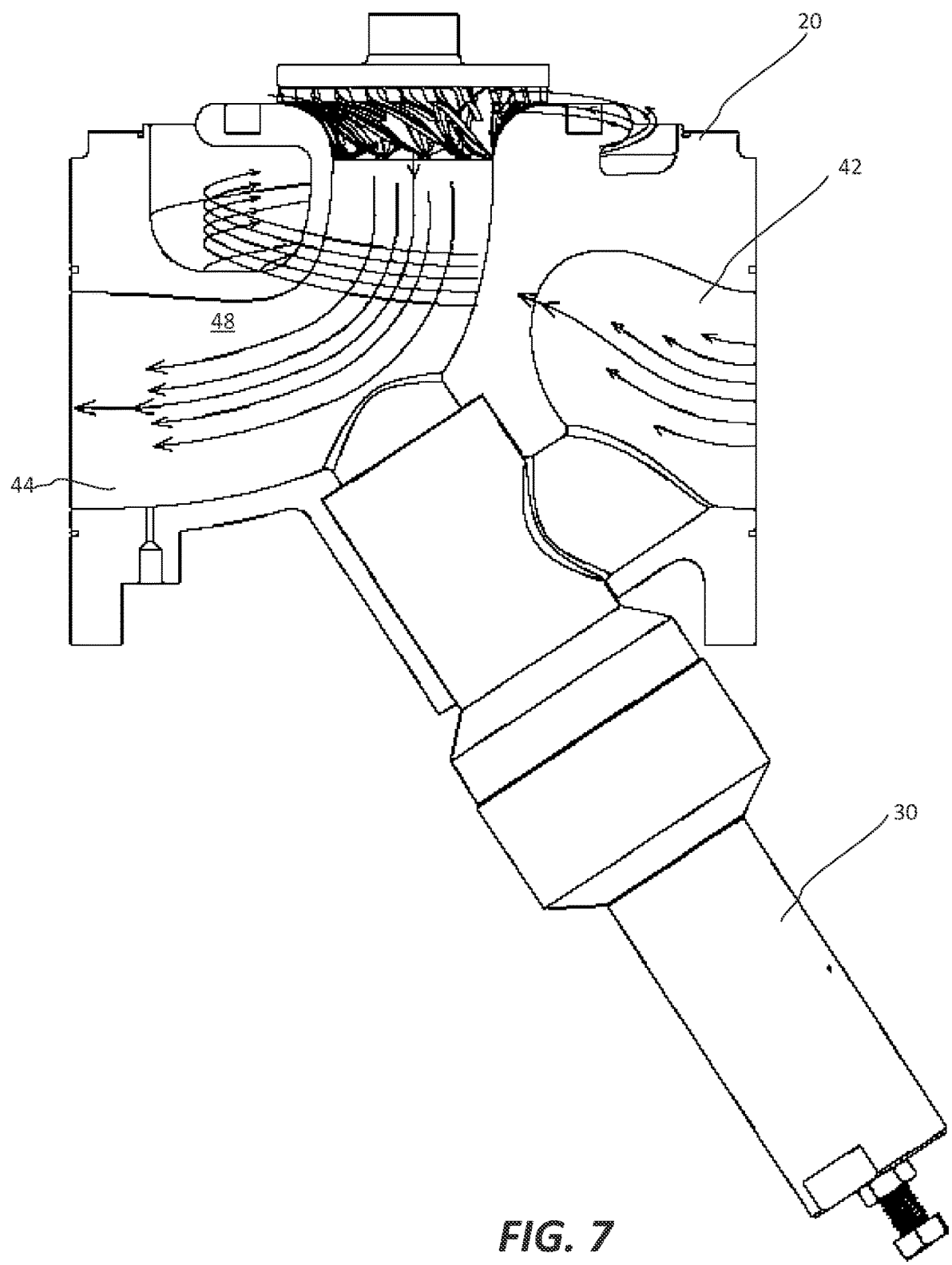
FIG. 7 depicts the energy-recovery system operating in turbine mode in which the turbine is generating electric power while regulating water pressure.
Figure 8:
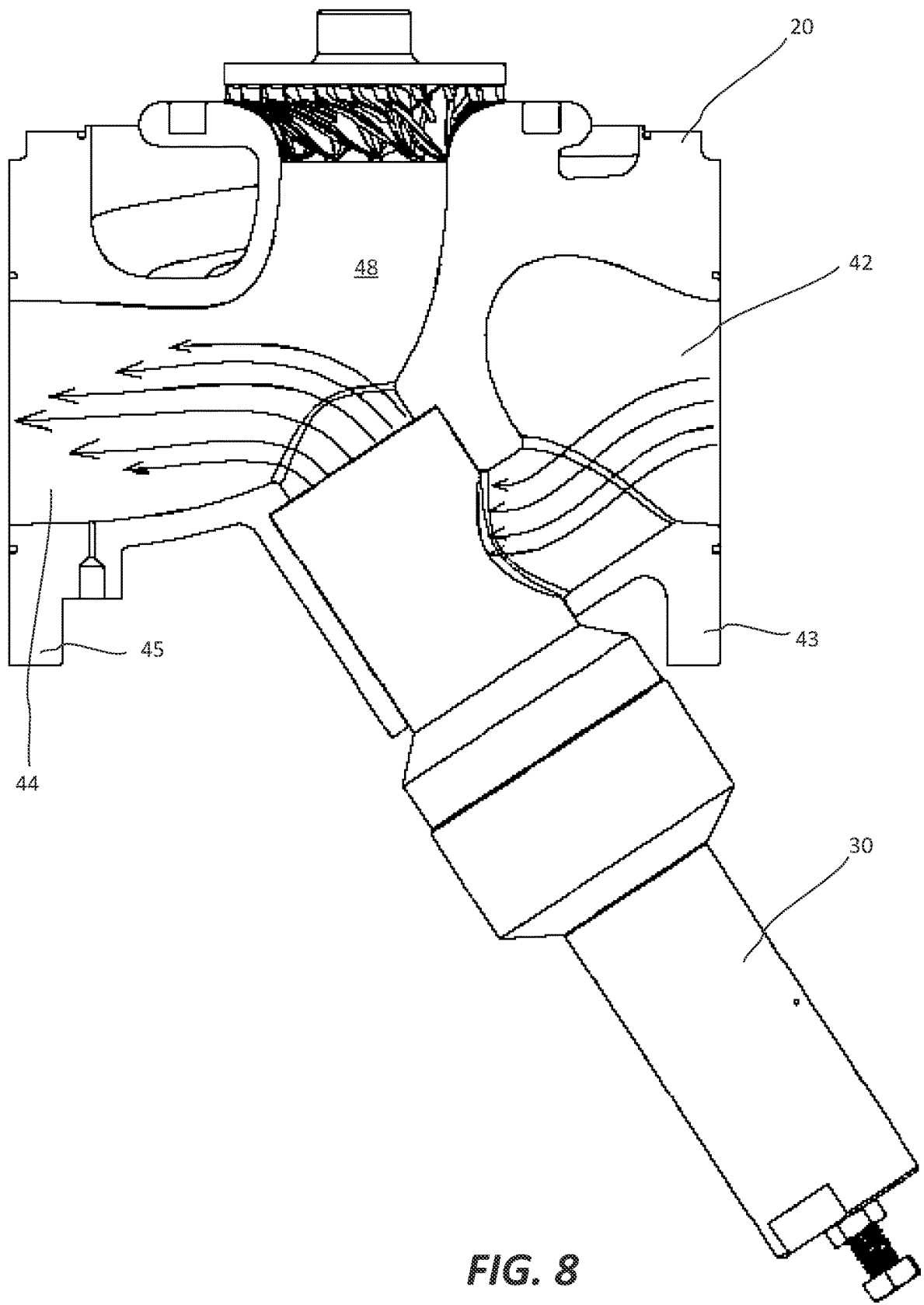
FIG. 8 depicts the energy-recovery system operating in a turbine-bypass mode, i.e. a PRV-only mode.

FIG. 7 and FIG. 8 depict the energy-recovery system operating in two different modes: a turbine mode (i.e. a normal mode) and a bypass mode (i.e. PRV-only mode). FIG. 7 depicts the energy-recovery system operating in a turbine mode in which the flow of water enters via the water inlet 42, flows into the turbine 20, exits the turbine via the elbow 48 and then flows out via the water outlet 44. In the turbine mode, the turbine both extracts energy from the flowing water and regulates water pressure. FIG. 8 depicts the energy-recovery system operating in the bypass mode in which the water flows through the water inlet 42 into the PRV 30 and thereby bypasses the turbine 20. If a turbine bypass condition occurs, such as a shut down of the turbine or grid, the water is diverted into the PRV by closing the guide vanes of the turbine. In the bypass mode, the PRV regulates the water pressure as the turbine is no longer functioning. To divert the water into the PRV, the variably adjustable guide vanes of the turbine are closed by the actuator 50 to block the flow of water into the turbine runner. The downstream water pressure due to the fully closed guide vanes overcomes the spring force of the PRV, thereby opening the PRV. Water thus flows through the PRV when the turbine guide vanes are fully closed.

Figure 9:
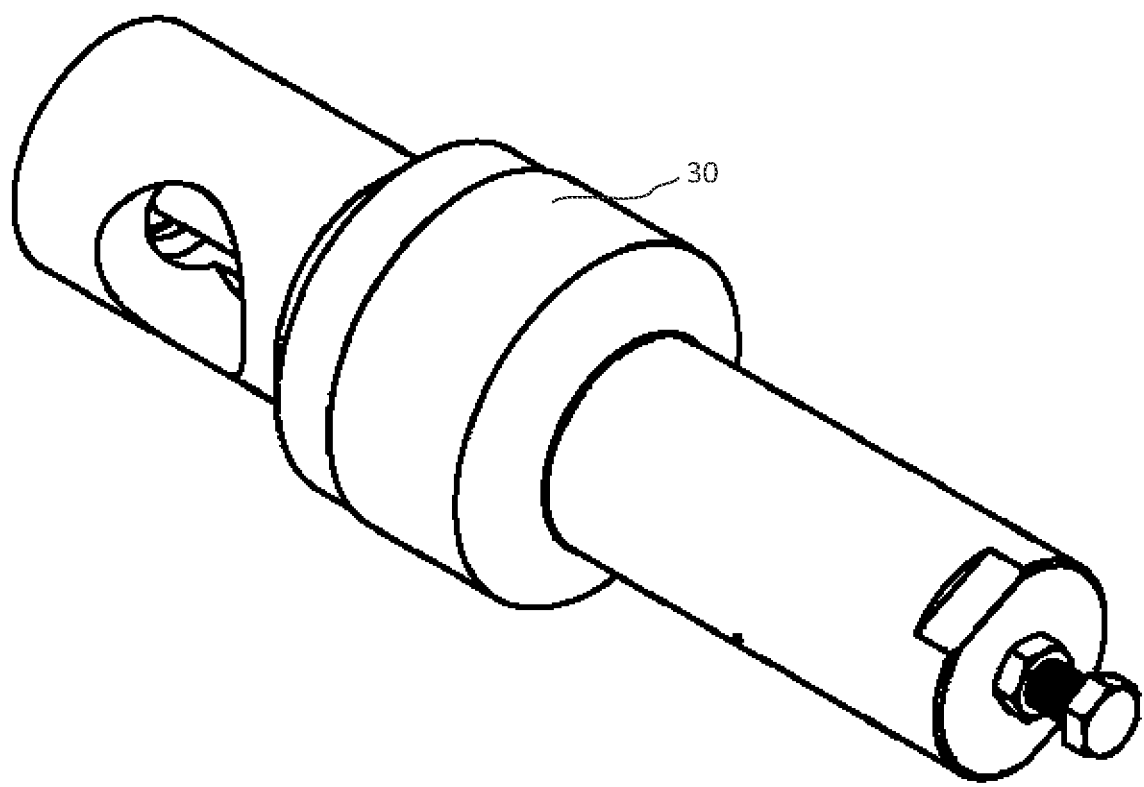
FIG. 9 is an isometric view of the PRV.
Figure 10:
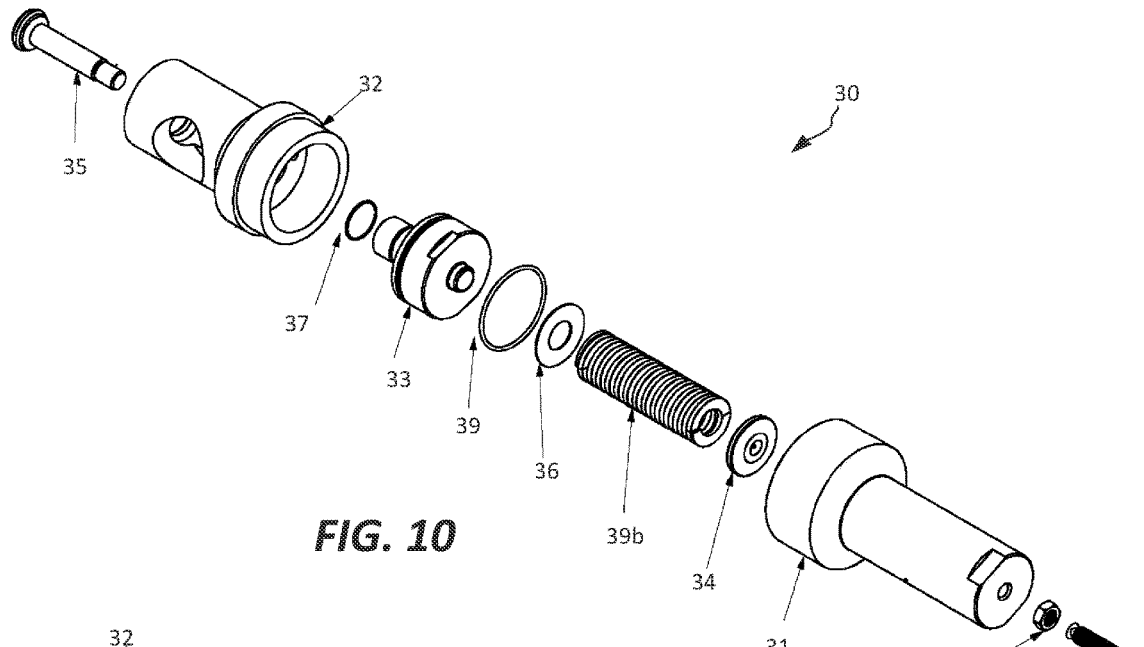
FIG. 10 is an exploded view of the PRV.
Figure 11:
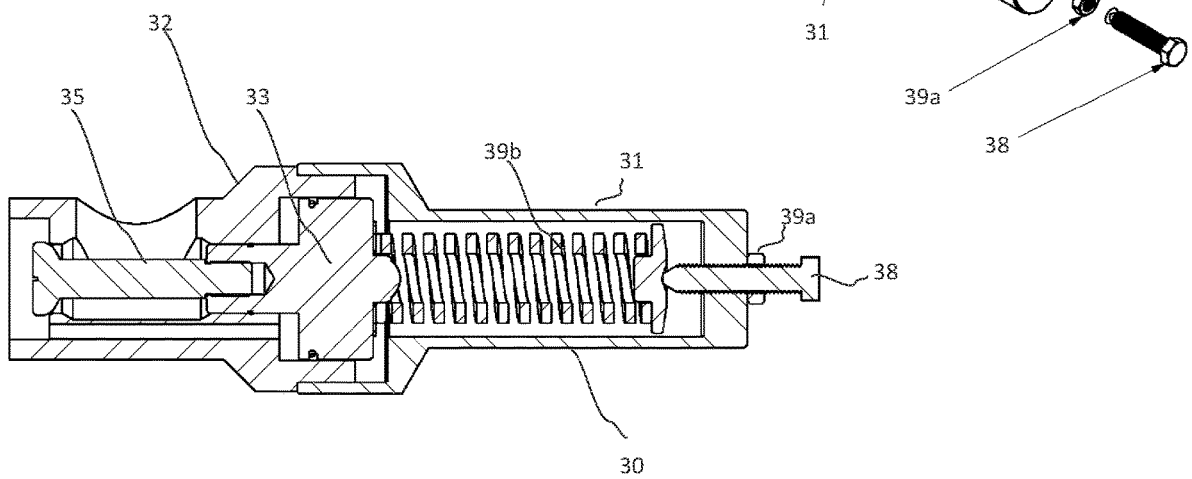
FIG. 11 is a cross-sectional view of the PRV.

FIGS. 9-11 depict further details of the PRV 30. FIG. 9 is an isometric view of the PRV, FIG. 10 is an exploded view of the PRV and FIG. 11 is a cross-sectional view of the PRV. As depicted particularly in FIGS. 10-11, the PRV 30 has a spring chamber 31, a body 32, a piston 33, a spring pusher 34, a poppet 35, a washer 36, a small O-ring 37, a bolt 38, a large O-ring 39, a nut 39a, and a spring 39b.

The energy-recovery system may be utilized in various industrial applications. For example, the system may be used in an underground mine. For example, the water line may be a pressurized water supply line extending down into an underground mine.

The energy-recovery system may also be used in the oil and gas industry. For example, the water line may be a pressurized water supply line used for extraction of oil or gas from an oil or gas deposit.

It will be appreciated that the energy-recovery system may be used in any analogous industrial application in which water pressure in a water line can be harnessed to extract energy.

A related aspect of the disclosure is a method of recovering energy from a flow of water. The method entails receiving the flow of water at an energy-recovery turbine from a water line to which the turbine is connected and generating electric power from the flow of water while also regulating water pressure. The method also entails selectively diverting water to a pressure-regulating valve (PRV) connected in parallel with the turbine to regulate water pressure in the water line in the event that the turbine becomes inoperative or shuts down. The method may be further performed by connecting a water inlet of a spiral water-flow adapter to an upstream portion of the water line and connecting a water outlet of the spiral water-flow adapter to a downstream portion of the water line, whereby the spiral water-flow adapter directs the flow of water from the water inlet into the turbine guide vanes and runner to the water outlet.

Optionally, the method entails sensing a pressure of the flow of water using a pressure sensor installed in the water outlet and controlling an actuator to close the guide vanes of the turbine to divert water to the PRV when the downstream pressure exceeds a threshold.

For the purposes of interpreting this specification, when referring to elements of various embodiments of the present invention, the articles "a", "an", "the" and "said" are intended to mean that there are one or more of the elements. The terms "comprising", "including", "having", "entailing" and "involving", and verb tense variants thereof, are intended to be inclusive and open-ended by which it is meant that there may be additional elements other than the listed elements.

This new technology has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant(s) is therefore intended to be limited solely by the appended claims.

The invention claimed is:

1. An energy-recovery system, the system comprising:
    an energy-recovery turbine to receive a flow of water from a water line to which the turbine is connected, wherein the turbine both generates electric power from the flow of water and regulates water pressure in the water line;
    a pressure-regulating valve (PRV) connected in parallel with the turbine and the water line to regulate pressure in the water line when the turbine is inoperative; and
    a spiral water-flow adapter having a water inlet for connecting to an upstream portion of the water line and a water outlet for connecting to a downstream portion of the water line, the spiral water-flow adapter directing the flow of water from the water inlet into a turbine guide vanes circle and runner and then from the turbine to the water outlet.

2. The system of claim 1 comprising a pressure sensor installed in an outlet elbow to sense a pressure of the flow of water to control an actuator to close guide vanes of the turbine when the pressure exceeds a threshold to thereby divert water to the PRV.

3. The system of claim 1 wherein the spiral water-flow adapter includes a 90-degree elbow for directing the flow of water from the turbine to the water outlet, wherein the PRV is connected to the elbow, wherein the PRV extends at an oblique angle downwardly from the elbow.

4. The system of claim 1 wherein the spiral water-flow adapter is formed as a single integral piece.

5. The system of claim 1 wherein the spiral water-flow adapter comprises a first flange at the water inlet for connecting to the upstream portion of the water line and a second flange at the water outlet for connecting to the downstream portion of the water line.

6. The system of claim 1 wherein the turbine is a Francis type turbine.

7. The system of claim 1 wherein an axis of rotation of the turbine is orthogonal to a notional line extending from the water inlet to the water outlet.

8. The system of claim 1 wherein the water line is a pressurized water supply line extending down into an underground mine.

9. The system of claim 1 wherein the water line is a pressurized water supply line used for extraction of oil or gas from an oil or gas deposit.

10. A method of recovering energy from a flow of water, the method comprising:
    connecting a water inlet of a spiral water-flow adapter to an upstream portion of a water line;
    connecting a water outlet of the spiral water-flow adapter to a downstream portion of the water line;
    receiving the flow of water at an energy-recovery turbine from a water line to which the turbine is connected, whereby the spiral water-flow adapter directs the flow of water from the water inlet into the turbine and then to the water outlet;
    generating electric power from the flow of water while also regulating water pressure in the water line; and
    if a turbine bypass condition occurs, diverting the flow of water to a pressure-regulating valve (PRV) connected in parallel with the turbine to enable the PRV to regulate the water pressure when the turbine is inoperative.

11. The method of claim 10 comprising:
    sensing the water pressure of the water using a pressure sensor installed in the outlet elbow;
    controlling an actuator to close guide vanes of the turbine to divert the water to the PRV when the water pressure exceeds a threshold or the turbine is out of service.

12. The method of claim 10 wherein the spiral water-flow adapter includes a 90-degree elbow for directing the flow of water from the turbine to the water outlet, wherein the PRV is connected to the elbow, wherein the PRV extends at an oblique angle downwardly from the elbow.

13. The method of claim 10 wherein the spiral water-flow adapter is formed as a single integral piece.

14. The method of claim 10 wherein the spiral water-flow adapter comprises a first flange at the water inlet for connecting to the upstream portion of the water line and a second flange at the water outlet for connecting to the downstream portion of the water line.

15. The method of claim 10 wherein the turbine is a Francis type turbine.

16. The method of claim 10 wherein an axis of rotation of the turbine is orthogonal to a notional line extending from the water inlet to the water outlet.

17. The method of claim 10 wherein the water line is a pressurized water supply line extending down into an underground mine.

18. The method of claim 10 wherein the water line is a pressurized water supply line used for extraction of oil or gas from an oil or gas deposit.

* * * * *